Sept. 16, 1930.   E. A. NELSON   1,775,944
TRANSMISSION
Filed May 19, 1928   3 Sheets-Sheet 1

INVENTOR.
EMIL A. NELSON
BY
ATTORNEY.

INVENTOR.
EMIL A. NELSON
BY
ATTORNEY.

Sept. 16, 1930. E. A. NELSON 1,775,944
TRANSMISSION
Filed May 19, 1928   3 Sheets-Sheet 3
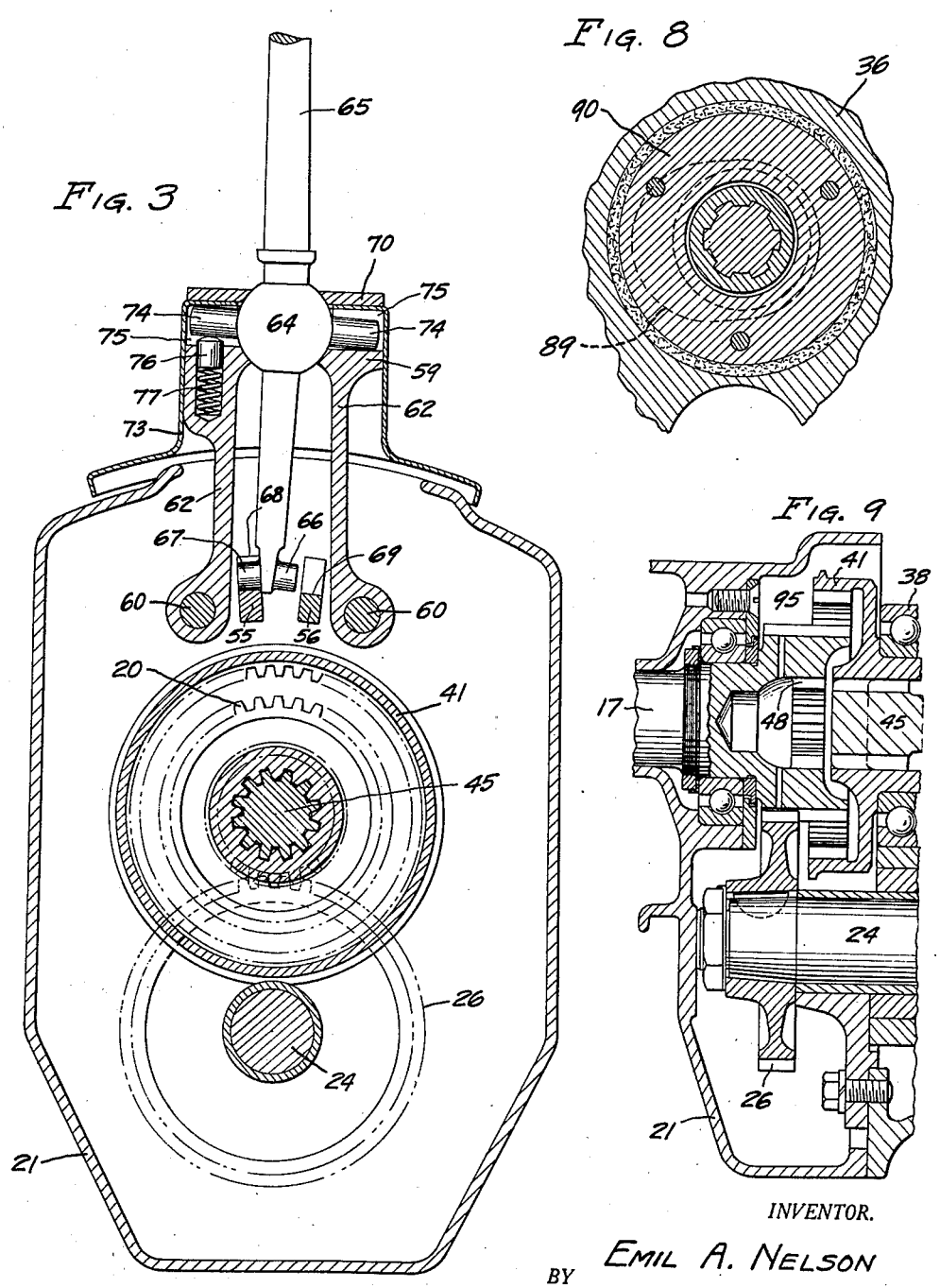
INVENTOR.
EMIL A. NELSON
BY
ATTORNEY.

Patented Sept. 16, 1930

1,775,944

UNITED STATES PATENT OFFICE

EMIL A. NELSON, OF DETROIT, MICHIGAN

TRANSMISSION

Application filed May 19, 1928. Serial No. 278,935.

This invention relates to change speed mechanisms such as are commonly employed in connection with motor vehicles, the principal object being the provision of a new and novel construction whereby an extra ratio may be obtained between the driving and driven shafts by use of a simplified construction.

Another object is to provide a change speed mechanism wherein the usual speed changes are obtained in the conventional way and an extra speed change is obtained by rocking a portion of the change speed mechanism out of its normal operating position.

Another object is to provide a change speed mechanism comprising a housing enclosing the driving and driven shafts and their cooperating gearing together with a counter-shaft, the driven shaft and the gears carried thereby being swingable as a whole about the axis of the counter-shaft, and the driving and driven shafts being provided with normally disengaged gear members engageable upon a pre-determined rocking movement of the driven shaft about the counter-shaft.

Another object is to provide a change speed mechanism comprising a housing carrying a counter-shaft, the counter-shaft being provided with a swingable frame in which the driven shaft is rotatably supported, means being provided for connecting the driven shaft to the driving shaft when in aligned position for direct drive therefrom, and the drive shaft and the driven shaft being provided with gear means disengaged when the driven and driving shafts are in aligned position and which may be moved into engaging position by rocking the frame about the counter-shaft, the driven shaft and the counter-shaft being provided with change speed gears of the conventional type.

A further object is to provide a new and novel control means for controlling a change speed mechanism of the type described.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views,—

Fig. 3 is a vertical sectional view taken on line 3—3 of Fig. 1.

Fig. 8 is a sectional view taken on the line 8—8 of Fig. 1.

Fig. 9 is a fragmentary view taken in the same plane as Fig. 1 showing a modification of the construction for driving the counter-shaft and the transmission shaft from the driving shaft.

There has been considerable time and effort spent in recent years in attempting to provide an additional speed ratio for the change speed mechanisms employed on motor vehicles. The additional ratio which it has been desired to obtain is one near and either slightly greater or slightly less than the direct speed so as to provide either an over or an under speed for the transmission. In some cases it has been thought desirable to provide a direct drive for use in city and like driving and to provide an over drive for use in country driving where greater speed is desirable and less acceleration is necessary. In other cases, it has been thought desirable to provide an under drive for city driving with a direct drive and comparatively low ratio between the propeller shaft and the axle shafts for country driving. Because of the nature of the use of such an over or under drive, that is, a long continuous use of the same, the construction must be such that the operation of the same is substantially noiseless or at least of substantially no greater noise than is present in direct drive. For this reason, it has been advisable to employ an external and a cooperating internal gear for providing such drive. In the past, as far as I know of, such an extra ratio has been provided by the employment of an additional unit to the usual change speed mechanism, thereby considerably increasing the length of the transmission, its weight, and further necessitating the employment of two control levers, one for the conventional transmission and one for the additional change speed which is usually in the form of an auxiliary. By the use of the present invention, I am enabled to provide an over or under drive for conventional type of change speed mechanism in such a manner as to increase the length and weight of the conventional constructions very little, if any, and which necessitates the use of a single control member only.

Figure 1:
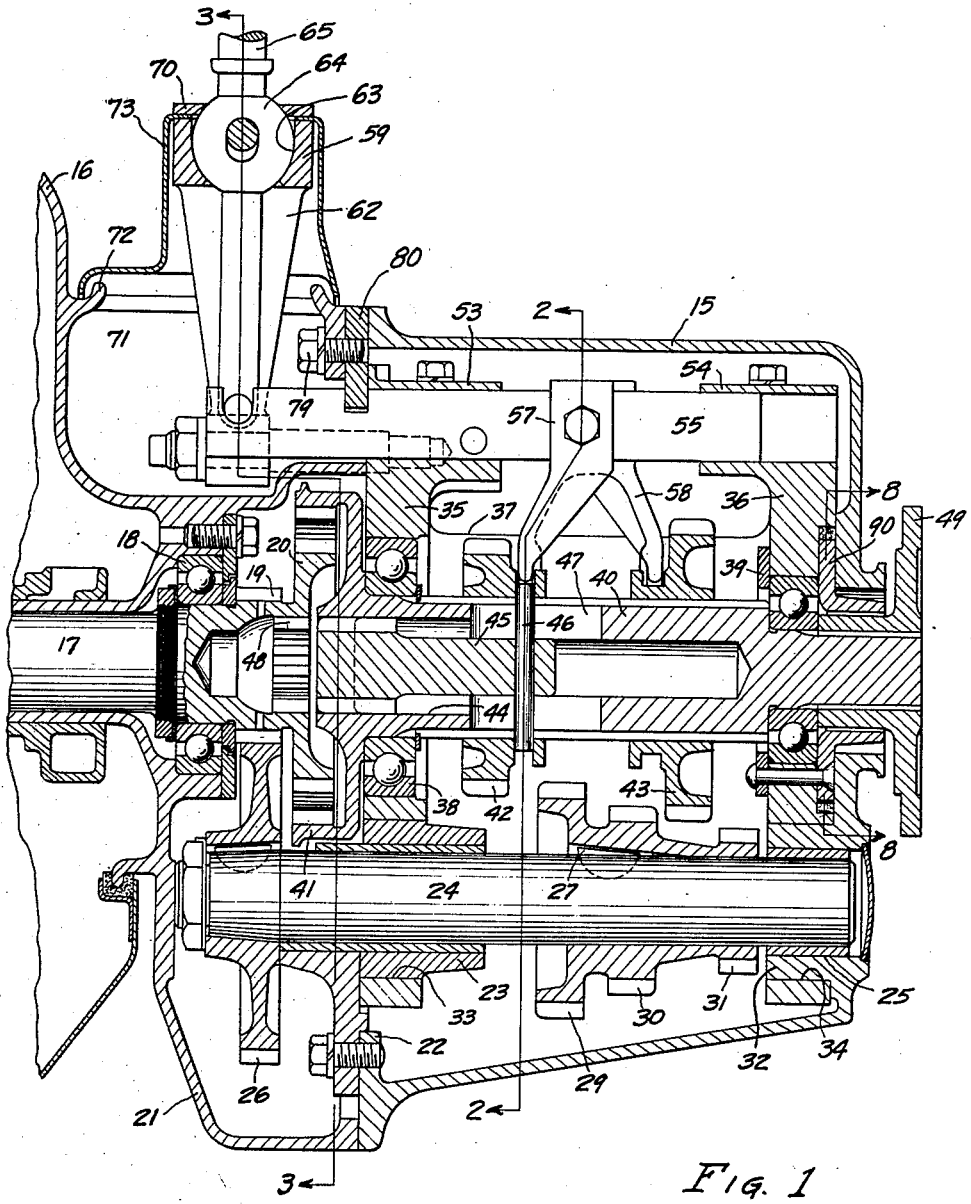
Fig. 1 is a vertical sectional view taken longitudinally through a transmission or change speed mechanism constructed in accordance with the present invention.

As illustrative of the present invention I show in the accompanying drawings and particularly in Fig. 1, a transmission casing or housing 15 secured to the rear face of a clutch housing 16 in the conventional manner by bolts (not shown) or other suitable means. The clutch driven shaft 17, which constitutes the driving shaft of the transmission, is suitably supported at its rear end by bearings 18 carried by the housing 16 and has formed thereon rearwardly of the bearings 18, a pair of gears 19 and 20. The rear end of the housing 16 is preferably extended as at 21 to envelop gears 19 and 20 at their sides and front. The transmission housing 15 is provided at its forward face with an inwardly extending flange portion 22 to which is secured an upwardly extending bearing support 23 for a counter-shaft 24, the rear end of the counter-shaft 24 being suitably supported in bushing 25 carried by the bearing support 32 at the rear end of the case. The forward end of the counter-shaft 24 has non-rotatably secured thereto a gear 26 which meshes with the gear 19 on the driving shaft 17 and which gears 19 and 26 constitute the constant mesh gears of the mechanism for driving the counter-shaft 24. Secured to the counter-shaft 24 against rotation by the key 27 between the bearing supports 23 and 32 is the usual gear cluster comprising the gears 29, 30 and 31. The bearing support 23 is provided with a cylindrical bearing surface 33 concentric with the axis of the counter-shaft 24, and the bearing support 32 is provided with a similar bearing surface 34. A frame member comprising the end wall portions 35 and 36 connected together by a pair of integral webs 37 is pivotally supported on the bearing surfaces 33 and 34. The forward wall 35 of the frame is provided with a bearing member 38, and the rear wall 36 is provided with a bearing member 39, the bearing members 38 and 39 being secured within the frame in axially parallel relation to the counter-shaft 24, which, of course, is parallel with the drive shaft 17, and with their axes at the same distance from the axis of the counter-shaft 24 as the drive shaft 17. Rotatably supported in the bearings 38 and 39 is the splined transmission shaft 40 which terminates at its forward end in an internal gear 41 lying in the same plane as the gear 20. A pair of sliding gears 42 and 43 are positioned on the transmission shaft 40 between the bearings 38 and 39 as in conventional transmissions. The forward end of the transmission shaft 40 is provided with a central opening 44 which is internally splined and in which is slidably received a splined member 45 which is connected by a pin 46 extending through the slot 47 in the transmission shaft 40 to the gear 42 for equal sliding movement therewith. The rear end of the drive shaft 17 is provided with a splined opening 48 into which the forward end of the member 45 may be moved when the transmission shaft 40 is aligned with the drive shaft 17 so as to lock the transmission shaft 40 to the drive shaft 17 for equal rotation therewith. The rear end of the transmission shaft 40 is provided with the usual flanged coupling member 49 for connection to the usual propeller shaft.

From the description thus far made it will be apparent that when the drive shaft 17 is rotated, the counter-shaft 24 is caused to rotate by means of the gears 19 and 26, the gear cluster 29, 30 and 31 rotating accordingly. It will also be apparent that when the shiftable member 45 is moved forwardly into engagement with the splined opening 48, the transmission shaft 40 is caused to rotate at the same speed as the drive shaft 17, thus effecting a direct drive. If the gear 42 and connected member 45 are moved rearwardly until the gear 42 meshes with the gear 29, the transmission shaft 40 will be driven by the drive shaft 17 through the gears 19 and 26, counter-shaft 24 and gears 29 and 42, thus effecting what is generally known as second or intermediate speed. If now the gear 42 is shifted out of mesh with the gear 29 and the gear 43 is shifted into mesh with the gear 30, what is known as low speed gear ratio will be effected, and if the gear 43 is shifted rearwardly out of mesh with the gear 30 and into mesh with the idler gear 50 which is supported by the shaft 51 carried by the rear wall 36 of the frame and which idler gear is in mesh with the gear 31, the drive from the drive shaft 17 to the transmission shaft 40 will be reversed in direction and what is conventionally known as reverse speed will be effected. If all of the shiftable members are now returned to their inoperative or neutral position, and the frame which carries the transmission shaft is pivoted about the axis of the counter-shaft 24 until the gear 20 moves in a substantially radial path into mesh with the internal gear 41, another speed ratio between the drive shaft 17 and transmission shaft 40 will occur and such ratio will constitute an under drive in the construction shown. It will be evident, of course, that if the gears 20 and 41 were reversed so that the gear 41 was formed on the rear end of the drive shaft 17 and the external gear 20 formed on the forward end of the transmission shaft 40, as may be easily done, and the frame swung about the axis of the counter-shaft 24 to bring them into meshing relationship, an over drive would be accomplished instead of the under drive as in the construction shown, and such an obvious variation is, of course, within the scope of the present invention.

The means for controlling the various positions of the shiftable elements and the pivotal position of the frame is accomplished in the following manner: The forward wall 35 of the frame is provided at its upper end with a bossed extension 53 and the upper end of the rear wall 36 of the frame is provided with a similar extension 54, and extending between and slidably received in the extensions 53 and 54 is a pair of spaced shifter members 55 and 56 which are rectangular in cross section and with the greatest dimension of the rectangle positioned in a substantially vertical direction. The member 55 is provided with a yoke member 57 secured thereto which engages the gear 42 for the purpose of controlling the axial position of the same on the transmission shaft 40 as in conventional constructions, and the member 56 is provided with a similar yoked member 58 engaging the gear 43. Threaded into the forward face of the wall 35 of the frame and extending forwardly thereof are a pair of post members 60 positioned on each side of the shifter members 55 and 56, and secured to the forward ends of the post 60 by the nuts 61 are the upwardly extending legs 62 of a yoke member 59 terminating at its upper end in a spherical seat 63 in which the ball 64 of the gear shift lever 65 is adapted to seat for universal movement. The lower end of the gear shift lever 65 extends downwardly to the plane of the shifter members 55 and 56 where it is provided with a pair of oppositely extending lugs 66 and 67 which are adapted to alternately engage the notches 68 and 69, formed in the shifter members 55 and 56 respectively upon suitable pivotal movement of the gear shift lever 65 on the ball 64. The ball 64 is maintained against the seat 63 by an annular plate 70 secured to the upper face of the yoke member 59. In order to prevent the entrance of dust and dirt to the ends of the shifting members 55 and 56 and to provide a more finished appearance, the rear end of the clutch housing 16 is formed to provide a pocket 71 having up-turned edges 72, and a cover member 73 is clamped between the plate member 70 and the yoke member 59 and extends downwardly into overlapping relationship with respect to the respective edges 72, the cover 73 being elongated in transverse dimensions as illustrated in Fig. 3 in order to allow sufficient pivoting movement of the frame with respect to the transmission housing 15 and clutch housing 16. The ball 64 is provided with a pair of oppositely extending pins 74 which are received in the slots 75 formed in the upper end of the cooperating yoke member 59, thereby preventing the gear shift lever from rotating about its axis. A plunger 76 urged upwardly from the bottom of the left hand slot 75 by the coil spring 77 bears against the left hand pin 74 and constantly urges the lower end of the shifter member 65 to the left, as viewed in Fig. 3, so as to move the lug 67 into engagement with the notch 68 in the shifter member 55.

Figure 7:
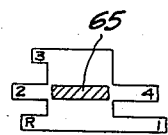
Fig. 7 is a more or less diagrammatic sketch showing how the gear shift lever may be moved to obtain the various speed ratios.
Figure 2:
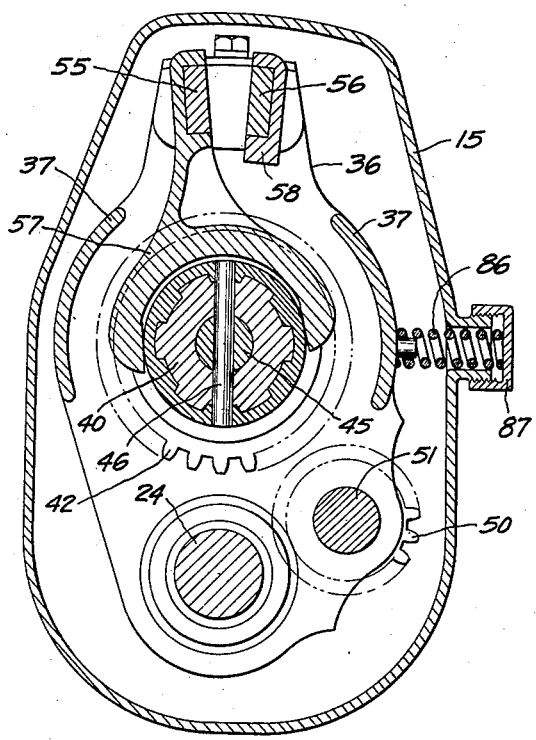
Fig. 2 is a vertical sectional view taken on line 2—2 of Fig. 1.
Figure 5:
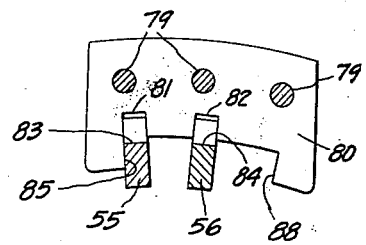
Fig. 5 is a face view of the locking plate which cooperates with the gear shift levers and locates the swinging frame in its swinging position, and shows the shifter levers in their position relative to the plate when the transmission mechanism is in normal position.
Figure 6:
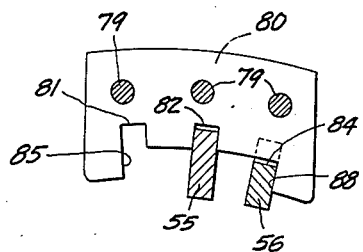
Fig. 6 is a view similar to Fig. 5 but showing the position of the shifter rods in relation to the plate when the mechanism has been shifted of its normal position to bring the additional set of gears into meshing relationship to provide an additional change of speed between the driven and driving shafts.

Secured to the rear face of the clutch housing 16 by a plurality of screws 79, and also clamped against the rear face of the clutch housing 16 by the forward face of the transmission housing 15, is a plate member 80 projecting downwardly from the upper wall of the transmission housing 15 and positioned transversely of the same. The lower edge of the plate member 80 projects below the upper edge of the shifter members 55 and 56 and is provided with a pair of notches 81 and 82 in which the shifter members 55 and 56 respectively are slidably received, the shifter members 55 and 56 being provided with notches 83 and 84 respectively in line with the plate member 80 when the shifter members 55 and 56 are in neutral position, the notches 83 and 84 being of sufficient size to slidably receive the plate 80 therein when the pivotal frame member is pivoted about the axis of the counter-shaft 24. The plate member 80 is provided with a shoulder 85 in line with the left end edge of the left hand notch 81 and against which the shifter member 55 normally bears, it being urged to such position by means of a coil spring 86 held under compression between one of the side members 37 of the swinging frame and an adjustable cap 87 carried by the side of the transmission housing 15, as illustrated in Fig. 2. In such position of the swinging frame as located by the shifter member 55 contacting against the shoulder 85, the transmission shaft 40 and the drive shaft 17 are held in axially aligned position so that the normal shifting movements of the transmission may be accomplished as in conventional constructions. The right hand side of the plate 80 is provided with a shoulder 88 similar to the shoulder 85 and spaced to the right of the notch 82 the same distance as the shoulder 85 is positioned to the left thereof. The plunger 76 in urging the left hand pin 74 upwardly constantly urges the lower end of the gear shift lever 65 to the left so as to bring the lug 67 into engagement with the notch 68 in the member 55 so that, as illustrated in the diagram in Fig. 7, a forward movement of the upper end of the lever 65 will shift the member 55 rearwardly carrying with it the gear 42 and member 46 and placing the transmission in second speed position, and a rearward movement of the upper end of the lever 65 will move the gear 42 and member 45 forwardly and place the transmission in direct drive position. If now the upper end of the lever 65 is moved to the left against the pressure of the spring pressed plug 76, the lug 67 will be moved out of the notch 68 and the lug 66 will be moved into the notch 69 in the member 56, and upon forward or rearward movement of the upper end of the gear shift lever 65, the gear 43 will be moved to place the transmission in reverse or low speed positions, as the case may be. In moving the upper end of the gear shift lever 65 to the left, it will be impossible to cause a pivoting movement of the supporting frame about the axis of the counter-shaft 24 inasmuch as the shifter member 55 is bearing against the shoulder 85 on the plate member 80. It will also be apparent that as soon as either shifter member 55 or 56 is shifted longitudinally when the transmission is in such position, the corresponding notch 83 or 84, as the case may be, will move out of alignment with the plate member 80 and the unnotched portion of the shifter member will engage the corresponding notch 81 or 82 in the plate member 80 and will thus positively lock the swinging frame against swinging movement so as to obviate any possibility of the gears 42 or 43 being shifted into mesh with their co-operating gears and simultaneous engagement of the internal gear 41 and external gear 20.

If it is now desired to place the transmission in its under drive speed position, the shifter members 55 and 56 are brought to neutral position so that the notches 81 and 83 and 82 and 84 respectively are in matching relationship, and the upper end of the gear shift lever 65 is moved to the right, thus causing the entire supporting frame to pivot about the axis of the counter-shaft 24 against the pressure of the spring 86 until the shifter member 56 abuts against the shoulder 88, at which time the gears 20 and 41 are in proper meshing relationship and the shifter member 55 has moved into line with the notch 82. Upon a forward movement of the upper end of the gear shift lever 65 at this point, the shifter member 55 will be moved longitudinally so as to bring the notch 83 therein out of transverse alignment with the plate 80, thereby locking the pivoting frame against pivoting movement with the gears 20 and 41 in meshing relationship. In order that this longitudinal movement of the shifter member 55 to lock the gears 20 and 41 in engagement will not interfere or will not cause engagement of the gear 42 with the gear 29, what would under ordinary conditions be an excessive distance between the gears 42 and 29 in conventional constructions is maintained, so that a slight shifting of the lever 65 to lock the frame against pivoting will be insufficient to mesh the gear 42 with the gear 29. Any suitable means may be provided such as a stop engageable with either the lower end of the gear shift lever 65 or with the shifter member 55 when in pivoted position, may be employed to prevent an excessive shifting movement of the shifter member 55 when moved to lock the pivoting frame against pivotal movement.

In Fig. 9 a modification of the drive between the drive shaft, the transmission shaft and the counter-shaft is shown. In this figure instead of providing the rear end of the drive shaft 17 with a pair of gears 19 and 20 as shown in Fig. 1, a single gear 95 is provided which has a face of a width equal to the combined face widths of the gears 19 and 20. The gear 26 on the counter-shaft 24 is in constant meshing relationship with the forward portion of the face of the gear 95, and the internal gear 41 may be brought into meshing relationship with the rear portion of the face of the gear 95 upon suitable rocking movement of the pivotal frame in exactly the same manner as the gear 41 may be brought into meshing relationship with the gear 20 in the construction illustrated in Fig. 1. By forming the gear as shown at 95 instead of the two separate gears 19 and 20 as shown in Fig. 1, a more economically manufactured construction is provided.

The rear face of the transmission housing 15 must, of course, be formed to permit the swinging movement of the transmission shaft 40 which projects therethrough. This is taken care of by providing an elongated opening 89 through which a flanged collar member 90 secured to the rear wall 36 of the frame and surrounding the hub of the flanged member 49 is received, suitable packing being provided for preventing the entrance of dust and dirt to and the escape of lubricant from the interior of the transmission casing 15.

Figure 4:
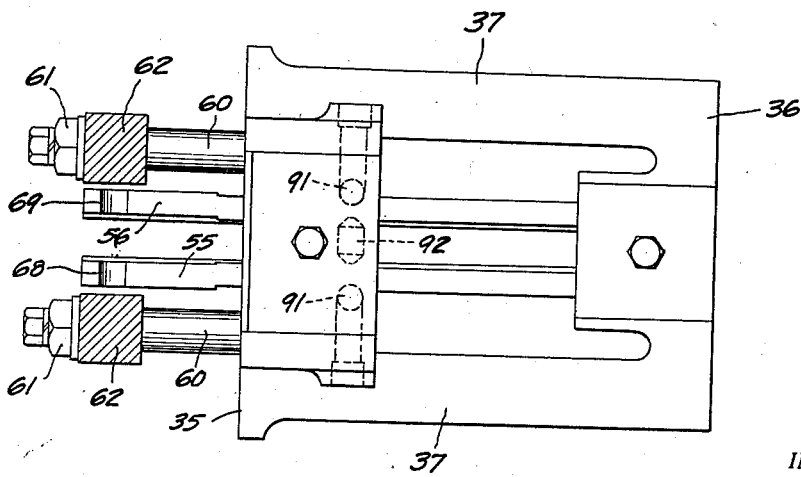
Fig. 4 is a top or plan view of the frame which carries the driven shaft showing the gear shifter members in position thereon.

Detents 91 and interlock 92 may be provided in the swinging frame, as indicated in Fig. 4, for cooperating with the shifter member 55 and 56 in the usual manner.

From the foregoing it will be apparent that by the device described above I have provided a simple construction for providing an extra change speed for a vehicle transmission which may be either an over drive or an under drive, that increases the size of the corresponding conventional transmission very little, if any, and which will increase the cost of the same very little, if any. In fact, it may well be possible that the ultimate cost may be less in view of the fact that the usual complicated construction of the transmission housing is simplified and those parts thereof which must be maintained with relatively close machining limits as to center distances are incorporated in the relatively simple frame member which may be quickly and easily machined.

Formal changes may be made in the specific embodiment of the invention described without departing from the spirit or substance of the broad invention, the scope of which is commensurate with the appended claims.

What I claim is:

1. In combination, a drive shaft, a counter-shaft, and a transmission shaft, said transmission shaft being shiftable into and out of alignment with said drive shaft, means for driving said counter-shaft from said drive shaft, selective means for driving said transmission shaft at various ratios of speed from said counter-shaft, means for clutching said transmission shaft directly to said drive shaft when said drive shaft and transmission shaft are in aligned positions, and additional means for driving said transmission shaft from said drive shaft when said transmission shaft is not in alignment with said drive shaft.

2. In combination, a drive shaft, a counter-shaft, a transmission shaft shiftable into and out of alignment with said drive shaft, gear means connecting said drive shaft with said counter-shaft, gears fixed to said counter-shaft, selectively slidable gears on said transmission shaft engageable with said gears fixed to said counter-shaft, a gear on said drive shaft and a gear on said transmission shaft lying in the same plane and directly engageable with each other upon a shifting of said transmission shaft out of alignment with said drive shaft, and a single control lever for controlling the position of said slidable gears on said transmission shaft and the shiftable position of said transmission shaft.

3. In combination, a housing, a drive shaft and a counter-shaft rotatably supported in fixed relationship with respect to said housing, a frame mounted within said housing to pivot about the axis of said counter-shaft, a transmission shaft rotatably supported in said frame, means for driving said counter-shaft from said drive shaft, selective gear means for driving said transmission shaft from said counter-shaft, and gear means on said drive shaft and said transmission shaft engageable upon a rocking movement of said frame about the axis of said counter-shaft.

4. In combination, a drive shaft, a counter-shaft driven therefrom, a swingable frame, a transmission shaft carried by said swingable frame and movable therewith into and out of alignment with said drive shaft, means for effecting a drive between said counter-shaft and said transmission shaft including a pair of gears, means for locking said transmission shaft to said drive shaft for equal rotation therewith, means for effecting a drive between said drive shaft and said transmission shaft by swinging said frame to move said transmission shaft out of alignment with said drive shaft, and a single member movable to selectively control all of said means, said member being carried by and movable relative to said frame.

5. In combination, a drive shaft, a counter-shaft driven therefrom, a movable frame, a transmission shaft carried by said frame and movable therewith into and out of alignment with said drive shaft, means for driving said transmission shaft from said counter-shaft, means for connecting said drive shaft and said transmission shaft directly together in alignment for equal rotation, a gear carried by said drive shaft, a gear carried by said transmission shaft engageable with the first mentioned gear upon a predetermined movement of said transmission shaft out of alignment with said drive shaft, and a lever pivotally mounted on said frame, said lever being movable relative to said frame to control said means and being movable with said frame to cause engagement of said gears.

6. In combination, a drive shaft, a counter-shaft driven therefrom, a movable frame, a transmission shaft carried by said frame and movable therewith into and out of alignment with said drive shaft, means for driving said transmission shaft from said counter-shaft, means for connecting said drive shaft and said transmission shaft directly together in alignment for equal rotation, a gear carried by said drive shaft, a gear carried by said transmission shaft engageable with the first mentioned gear upon a predetermined movement of said transmission shaft out of alignment with said drive shaft, a lever pivotally mounted on said frame, said lever being movable relative to said frame to control said means and being movable with said frame to cause engagement of said gears, and means controlled by a movement of said lever relative to said frame after movement of said frame to cause engagement of said gears for locking said frame in its moved position.

7. In combination, a drive shaft, a counter-shaft driven therefrom, a movable frame, a transmission shaft carried by said frame and movable therewith into and out of alignment with said drive shaft, means for driving said transmission shaft from said counter-shaft, means for connecting said drive shaft and said transmission shaft directly together in alignment for equal rotation, a gear carried by said drive shaft, a gear carried by said transmission shaft engageable with the first mentioned gear upon a predetermined movement of said transmission shaft out of alignment with said drive shaft, a lever carried by said frame and pivotable relative thereto to control said means, means for limiting the pivotal movement of said lever relative to said frame whereby said lever may control the movable position of said frame, and means movable by movement of said lever relative to said frame for locking said frame against movement.

8. In combination, a housing, a rotatable drive shaft having bearings fixed relative to said housing, a rotatable counter-shaft having bearings fixed relative to said housing, said counter-shaft being driven from said drive shaft, a frame mounted within said housing to swing about the axis of said counter-shaft, a transmission shaft rotatably mounted in said frame, a gear on said counter-shaft, a gear slidably mounted on said transmission shaft shiftable into mesh with said gear on said counter-shaft, a gear on said drive shaft, a second gear on said transmission shaft engageable with said gear on said drive shaft upon a predetermined swinging movement of said frame, means movable with the first mentioned gear on said transmission shaft for locking said transmission shaft to said drive shaft when in alignment therewith, a slidable member carried by said frame connected with the first mentioned gear on said transmission shaft, a lever universally movable on said frame for controlling said sliding member, and means co-operating with said sliding member for locking said frame against swinging upon a predetermined movement of said lever.

9. In a transmission in which certain gear ratios are obtainable by shifting members axially on the transmission shaft and another ratio is obtainable by swinging said transmission shaft out of alignment with the drive shaft, in combination, a housing for said transmission, a frame swingable relative thereto and supporting said transmission shaft, parallel sliding members carried by said frame connected to said shiftable members on said transmission shaft, a lever universally mounted on said frame for movement therewith and relative thereto, said sliding members being selectively engageable by said lever, a member fixed relative to said housing, and interengaging means on said fixed member and said sliding members co-operating to lock said frame against swinging movement upon movement of said lever to move either of said sliding members out of their normal inoperative position.

10. In a transmission in which certain gear ratios are obtainable by shifting members axially on the transmission shaft and another gear ratio is obtainable by moving the transmission shaft out of alignment with the drive shaft, in combination, a pivoted frame supporting said transmission shaft, a pair of slidable members controlling the position of said shiftable members on said transmission shaft, a lever universally mounted on said frame selectively engageable upon a lateral pivotal movement thereof with either of said slidable members and adapted to move the corresponding shiftable member on said transmission shaft upon a forwardly or rearwardly pivotal movement thereof, and means for limiting lateral pivotal movement of said lever relative to said frame in one direction whereby a further movement of said lever in that direction will cause a pivotal movement of said frame.

11. In combination, a clutch shaft, a counter-shaft drivable therefrom, a swingable frame, a hollow transmission shaft carried by said swingable frame and movable therewith into and out of alignment with said clutch shaft, means for effecting a drive between said counter shaft and said transmission shaft including a pair of gears, means for locking said transmission shaft directly to said clutch shaft for equal rotation therewith comprising a member slidable in the bore of said transmission shaft, and means for effecting a drive between said clutch shaft and said transmission shaft independent of said counter shaft by swinging said frame to move said transmission shaft out of alignment with said drive shaft.

12. In combination, a clutch shaft, a counter-shaft drivable therefrom, a swingable frame, a hollow transmission shaft carried by said swingable frame and movable therewith into and out of alignment with said clutch shaft, means for effecting a drive between said counter shaft and said transmission shaft including a pair of gears one of which is slidable on said transmission shaft, means for locking said transmission shaft directly to said clutch shaft for equal rotation therewith comprising a member slidably but relatively non-rotatably received in the bore of said transmission shaft and fixed against relative axial movement to said gear slidable on said transmission shaft, and means for effecting a drive between said clutch shaft and said transmission shaft independent of said counter shaft by swinging said frame out of alignment with said drive shaft.

13. In combination, a clutch shaft, a counter shaft, a pair of gears connecting said shafts for simultaneous rotation, a swingable frame, a transmission shaft supported by said swingable frame against axial movement and movable therewith into and out of alignment with said clutch shaft, means for effecting a drive between said counter shaft and said transmission shaft including a second pair of gears one of which is selectively shiftable into and out of engagement with the other thereof, means for locking said transmission shaft directly to said clutch shaft for equal rotation therewith, and means for effecting a drive between said clutch shaft and said transmission shaft independently of said counter shaft by swinging said frame to move said transmission shaft out of alignment with said drive shaft.

14. In combination, a drive shaft, a counter shaft, a pair of gears connecting said shafts for simultaneous rotation, a swingable frame, a transmission shaft supported by said swingable frame against axial movement and movable therewith into and out of alignment with said drive shaft, means for effecting a drive between said counter shaft and said transmission shaft including a second pair of gears, a single means for locking said transmission shaft to said drive shaft for equal rotation therewith, and means for effecting a drive between said drive shaft and said transmission shaft independently of said counter shaft by swinging said frame to move said transmission shaft out of alignment with said drive shaft.

15. In combination, a drive shaft, a counter shaft, a pair of gears connecting said shafts for simultaneous rotation, a swingable frame, a transmission shaft supported by said swingable frame against axial movement and movable therewith into and out of alignment with said drive shaft, means for effecting a drive between said counter shaft and said transmission shaft including a second pair of gears, means for effecting a drive between said drive shaft and said transmission shaft independently of said counter shaft including a third pair of gears adapted to mesh upon swinging of said transmission shaft out of alignment with said drive shaft, and means for connecting the drive shaft and transmission shaft for equal rotation when they are in axial alignment.

EMIL A. NELSON.